Patented Mar. 14, 1933

1,901,324

UNITED STATES PATENT OFFICE

EMIL E. NOVOTNY, OF PHILADELPHIA, PENNSYLVANIA, ASSIGNOR TO JOHN STOGDELL STOKES, OF HUNTINGDON VALLEY, PENNSYLVANIA

ABRASIVE BODY AND METHOD OF MAKING THE SAME

No Drawing.   Application filed July 26, 1929. Serial No. 381,384.

This invention relates to the manufacture of various articles of bonded granular abrasive material such as grinding wheels, discs, segments, blocks, etc. wherein a synthetic resin product is utilized as a bond for the abrasive granules.

The chief object of my invention is to provide a method whereby various synthetic resins of a sticky, balsamlike nature may be used as a bond for abrasive granules and whereby these sticky, gummy, thoroughly coated granules may be, at will, converted to a dry, loosely granular mass to permit such granules to be readily and uniformly leveled.

For the purpose of my invention I may utilize various synthetic resins of either the phenol type or those of the glyptal type or, for that matter, any liquid or balsamlike synthetic resin product capable of wetting the abrasive granules and capable of being converted in any suitable manner to a strong, hard product. To these resins I add suitable granular material in any desired proportion but primarily with the object of utilizing the synthetic resin as a coating or bond for such granules. This mixture is preferably made without the addition of solvents or special plasticizing agents except such as would be normally used in connection with synthetic resins. These granules are thoroughly coated with the balsamlike synthetic resin, forming a sticky, gummy mass.

This sticky, gummy mass would be difficult to level but I have discovered that by cooling the mass, either by placing the same into a suitable refrigerator or by adding thereto a suitable refrigerant such as, for example, solidified $CO_2$, I am enabled to convert the gummy mass while cold to a dry, non-sticky product which will readily break up into individual granules and which may be uniformly leveled within the mold.

This refrigerated mass may be kept in its loosely granular form while cold and will, upon being pressed in either cold or heated molds, provide a mass of the desired adhesive power either due to elevated temperatures or due to the pressure exerted upon the product.

In U. S. Patent 942,808, granted December 7, 1909, to Leo H. Baekeland, we are taught that synthetic resins of the phenol-formaldehyde type could be employed in the production of abrasive wheels and the like by merely commingling such abrasive material with the mixture of phenol and formaldehyde or with the phenolic condensation product and subsequently shaping the composition to suitable form as through the action of heat and pressure in positive molds. This product, if composed of the mixture of phenol and formaldehyde, is a liquidlike watery mass which would not remain on the granules inasmuch as it would flow from these granules because of the low viscosity of the mixture, and for this reason it would not be possible to secure an abrasive structure of the usual porous type by utilizing a product of this kind. In this patent the statement is also made that highly liquid condensation products of phenol and formaldehyde may be further heated or dried before mixing with the abrasive material and under such treatment such condensation product will acquire increased viscosity until a point is attained at which it is of a sticky or rubberlike consistency, when such product may be mixed rapidly with an abrasive material and such material may then be readily subjected to the molding and hardening operations. This sticky product of Baekeland's has not found a commercial use in the manufacture of abrasive wheels inasmuch as it is impossible to properly level such abrasive material in order to obtain a wheel having an almost perfect running balance; and as such wheels are used at high operating speeds, a wheel out of balance would be a source of danger to the operator using it. By my method, however, this sticky, gummy mass described by Baekeland is suitable for my purpose inasmuch as I cool or freeze this mass and by rapidly stirring I break up the particles whereby the relatively non-sticky, dry mass, for the time being, can be leveled in the mold with great exactitude and may be molded by raising the temperature of the mass to the proper sticky consistency after such leveling operation. This permits me to produce a grinding disc or wheel having great uniformity of strength, freedom from imperfections, and thus uniformly producing the required dynamic balance.

In U. S. Patent 1,537,454, issued to Frank P. Brock, of June 12, 1925, we are taught that the proper synthetic resin bond for abrasive discs is a dry, pulverized synthetic resin of the phenol-formaldehyde type and that the abrasive granules and synthetic resin should be thoroughly commingled, and to this should be added an aldehyde having the function of a solvent, plasticizer and hardening agent. The mixing is continued until the mass acquires a uniform, sticky or tacky consistency, and in this condition is charged into a mold of appropriate form wherein the product is subjected to heavy pressure for a brief period of time. This patent also discloses the use of furfural as a solvent, plasticizer and hardening agent, and the sticky and gummy mass is produced through the addition of this furfural. The process of this patent could not be employed to produce a satisfactory grinding disc or wheel inasmuch as the sticky, gummy mass could not be leveled uniformly in the mold and, therefore, products of un-uniform dynamic balance were produced. Although I do not find furfural useful or necessary for my purpose, my method will enable the use of this sticky, gummy mass as the material may be readily pulverized and may be kept in such granular condition until the mass has been leveled and may be caused to assume any desired tacky consistency through the elevation of the temperature of the mass.

In U. S. Patent 1,626,246, of April 26, 1927, to Harry C. Martin, is disclosed the use of dry, powdered synthetic resin of the phenol-formaldehyde type. In this case the abrasive granules are first wetted with furfural, which is a solvent for the resin and subsequently becomes a hardening agent for the same, and thereupon the powdered synthetic resin is slowly added and by properly regulating the proportion of granular material, resin solvent and powder resin added, a substantially dry mass will be formed. This mass may be leveled to a much better extent than the mass described by Brock but the product is still sticky, and when first mixed must be broken up through a coarse sieve, and it is found, quite often, that considerable quantities of the resin have formed lumps or balls and, therefore, the uniformity of the product varies considerably. Furthermore, the amount of furfural used must be varied from day to day because of variations in the proportion of abrasive granules and because of variations in the softening point of the resin used. The resin must be ground to a fineness of approximately 200 mesh, which is a difficult and expensive operation. The mixture of furfural, abrasive granules and synthetic resin cannot be kept on hand for more than a few hours inasmuch as the furfural will harden the mass to a gel-like consistency and there will not be sufficient tackiness to the mass to make the product usable for molding, and quite often it is found necessary to discard such products after they have stood around for a comparatively short period of time.

With my method it is possible to utilize most any type of synthetic resin bond having sufficient strength when set to withstand the stresses and strains of the work to be performed. I am enabled to use products of relatively high viscosity and of a balsamy and sticky nature, enabling me to thoroughly coat the granules of abrasive material with great uniformity, and such products may be kept on hand for several months, if desired, prior to their use as a mixture in ready-to-use form, requiring only to be cooled to eliminate the sticky, tacky property of the product for the time being and to make it possible to break the composition up into uniform size particles, whereby a uniform distribution of coated particles may be had within the mold cavity. There is no loss of material and none is discarded because of the premature hardening of the mass.

Briefly, my product and method comprise the steps of

1. Coating the granular material with a small quantity of synthetic resin balsam or varnish, preferably of high viscosity and adhesive power.

2. Cooling such coated mass whereby the synthetic resin loses its liquidlike character and becomes a comparatively dry, non-adhesive product while cold.

3. While in such dry, cold condition, breaking the mass into individual granules of comparatively small size.

4. Distributing the dry, cold granules to a suitable level as, for example, in a mold cavity.

5. So regulating the temperature of the mass while being formed, as in the mold, whereby the abrasive granules and synthetic resin compound assume the desired sticky consistency to enable the satisfactory molding of the product to the desired shape.

6. Removing the molded body from the mold cavity and hardening the mass to a product of great mechanical strength and freedom from stickiness.

In order that my invention may be better understood, I am giving the following illustrative example:

Into a suitable mixing device such as is used in the making of abrasive wheels, as, for example, the paddle type mixer, I place 350 grams of #54 silicon carbide, and with the paddles in operation at suitable speeds I add 50 grams of a phenol-formaldehyde liquid resin of the potentially reactive type. The phenol-formaldehyde resin is preferably of high viscosity; i. e., in the neighborhood of say 350 Stoermer or higher although, of course, products of lower viscosity could be used as, say, products having a viscosity as low as 100 Stoermer. It is essential, however, that such liquid resin or balsam have sufficient body in order that the product may properly coat the resin granules and remain in place and that, also, the product be preferably of a sticky and tacky consistency. The mixer is operated for a period of about five minutes until the liquid resin or balsam has been thoroughly dispersed in the mass, and this time may vary somewhat, depending, of course, upon the proportions of granular material used and the coarseness of the same. A finer subdivision of granules will require a somewhat longer time inasmuch as the function of the liquid resin or balsam is to thoroughly and uniformly coat all surfaces of the abrasive material. After the abrasive granules have been thoroughly coated, I place about 200 grams of $CO_2$ ice into the mixer while the stirrer is still in operation, whereupon the sticky consistency of the granules is changed because of cooling to a dry, non-sticky mass, and the particles again revert to the dry granular product although each particle carries a proper coating of cooled or chilled synthetic resin. The material in this condition may now be placed into a refrigerator if is to be kept on hand for a considerable length of time in such granular condition, or it may be placed into a mold cavity whereby the product may be leveled with exactitude in order to insure a formed object of uniform density throughout. With the material leveled in the mold taking up heat, the desired stickiness will readily be obtained and the product may now be pressed into the desired shape at varying pressures as the nature of the work in hand requires or pressures of say from 500 pounds to 2000 pounds to the square inch. This high pressure also causes the mass to become sticky and tacky and the abrasive material uniformly coated with the synthetic resin varnish or balsam causes the product to be brought into more intimate contact with the mass of other coated granules and a shaped and formed object of silicon carbide breaking with a crystalline fracture is uniformly reinforced and bonded with a synthetic resin product breaking with a concoidal fracture, thus imparting great strength to the bonded material.

The formed shapes, which may be discs, wheels or, for that matter, filtering surfaces, may be removed from the mold and placed into a suitable oven and hardened as by gradually increasing temperatures for a period of say from 5 to 52 hours at a starting temperature of say 175° F. and ending at from 350 to 390° F., the time and temperature dependent, of course, upon the size and shape of the objects being hardened and type of oven being used. If this hardening is carried out under counteracting pressures, the cure may be more rapid. The hardening of synthetic resin bonded abrasive wheels and other shapes is already well understood in the art and varies with the type of resin used, its reactivity, tendency to foam and blister, and the type of work, i. e., the proportion of resin bond used in the production of the pieces. The hardening should be conducted under such conditions of temperature and time as will result in a thorough bonding of the resin coated abrasive particles through the cohesion and adhesion of the resin bond.

Abrasive wheels, discs and other shapes made by my method have greatly improved strength and balance. This has been repeatedly demonstrated, the product showing a high degree of deflection, tensile and transverse strength. Strength and dynamic balance are essential, particularly for the production of wheels and discs as many of these bodies are used at high operating speed and as these bodies are often as thin as $\frac{3}{32}''$.

Molds are preferably cold inasmuch as I have found it preferable to use sticky, tacky, liquidlike bodies having these properties at or about room temperature, and, therefore, there is no need for the heating of the molds in order to secure the proper degree of cohesion. While the bodies are preferably shaped in the cold, there is nothing, of course, which would prohibit the use of slightly warmed molds or, for that matter, heated molds, in which case the hardening of the bodies could even take place within the heated mold. This method of operation, however, would be more expensive than the cold molding of the wheels and the subsequent hardening of these either through oxidation or through heat treatment as in an oven. Furthermore, it is not necessary that these bodies be shaped through the action of a squeeze or pressure as in a mold, but they may be formed by the process of tamping, jarring, or the coated particles may be rolled into shape in a suitable rolling device provided with pressure cones. In this case, also, the hardening is carried out preferably by subsequent heat treatment in an oven, although if an oxidizing form of synthetic resin is used the hardening could take place in a suitable atmosphere where such oxidation would be accelerated.

While I have pointed out the use of my method for the production of abrasive wheels, discs and like bodies, it is to be understood that the cooling of the abrasive resin coated particles to the point where they may be separated into individual granules is also a decided advantage in the production of grain surfaces utilizing a paper or cloth back as, for example, in the production of abrasive and paper cloths of sand, glass, flint, synthetic abrasive compounds such as carborundum, alundum, etc., inasmuch as these individual particles in their non-sticky condition may be readily fed from a hopper or reservoir through a feeding device whereby such particles are uniformly dropped in their non-sticky condition on to the surface of the paper or cloth to be coated. And if the paper or cloth is heated at or above room temperature, the coated particles upon striking the surface of the sheet will immediately assume their sticky and tacky condition, adhering to the base material and cohering to each other, thus producing a product of great strength and having only a minimum amount of resinous body on the exposed surfaces utilized for abrasion and polishing. If such particles are applied to a web of paper or cloth and this web is subsequently fed through a heated tunnel or through an oxidizing atmosphere, the granules will be permanently set to the base material and the entire operation can be carried out economically and uniformly.

Wherein I have given certain proportions of synthetic resin to abrasive granules it is to be understood that this proportion may be greatly varied as is now well understood in the art, inasmuch as in some cases the object is to produce a porous abrasive body and in this case only a sufficient amount of liquid resinous material should be used to properly and thoroughly coat all of the resinous particles with a film sufficiently heavy to enable such bodies to be bonded through the cohesion of a sufficiently heavy film of resinous material. Where finer abrasive granules are used than those specified, a somewhat larger proportion of resinous material is needed and inversely in proportion where a larger granule is used. On the other hand, for certain heavy duty abrasive wheels such as those of the snagging type used in foundries, etc., a more solid wheel is needed and porosity is not as essential for this rough work. In this case the granules may be compressed under a heavier pressure to obtain a greater density or a mixture of fine and coarse granules would be in order or a larger percentage of liquid resin to granules would be advisable.

The dry refrigerant, solidified $CO_2$, may be used in most any proportion as the particular conditions of the work require, and depending upon the room temperature, melting point of the liquid resin, and the temperature of the granules being coated thereby. If, for instance, the granules were refrigerated prior to use, and the mixer itself was kept in a relatively cold condition, the liquid resin when used in the ordinary low proportions could be added to this refrigerated mass, and by rapidly stirring a coating would be obtained on the particles and eventually the resin which is a slow conductor of heat would give off a sufficient amount of heat to solidify to a non-sticky coating with the abrasive mass well broken up into individual abrasive particles which have now, of course, been coated. It can readily, therefore, be seen that I may operate by my method without the addition of any refrigerant and that I may use the abrasive particles themselves as the refrigerant or that I may cool the mixing device without the addition of any substance of a cooling nature, or that I may add a greatly reduced amount of $CO_2$ solid, depending, of course, upon the manner of operation.

It is also to be understood that it is not essential that I add a refrigerant or a cooled body into the mixer where the coating of the abrasive particles with the resin is made; nor is it necessary that the mixer be cooled, but the mixing may be done at ordinary room temperature and the sticky, coated mass thereupon transferred in batches or otherwise into a suitable refrigerator whereby the mass is cooled to the point that the particles may be readily broken up as by being jarred or by being passed through a coarse sieve. The refrigerator likewise would be of use for the purpose of storing loose coated abrasive particles for subsequent forming operations.

Various refrigerating means may be utilized for either the refrigerator or the introduction of the refrigerant directly into the abrasive composition or for the purpose of cooling the mixing device. Products of a gaseous nature such as ammonia and sulphur dioxide could be used for mechanical refrigeration whereas liquids such as carbon dioxide, liquid air and other liquefied gases which may or may not be readily converted into solid refrigerants such as the solidified carbon dioxide, snow or compressed product are useful for direct introduction into the plastic abrasive mass.

Carbon dioxide is a very convenient form of refrigerant and the use of this material expedites operations considerably, and as the product is relatively inexpensive and can be readily made from liquid carbon dioxide, the use of this product is advantageous. The material is chemically inert so far as synthetic resins are concerned and is, therefore, readily eliminated from the mass without difficulty and can be used for the production of either the solid or porous type of abrasive wheel. It is to be understood, however, that ordinary ice can be used for the purpose of cooling the mixed mass of resin and abrasive particles. The abrasive particles, chiefly consisting of carborundum, do not readily absorb water nor are they readily wetted thereby; and if previously coated with the sticky, tacky film of resinous material which likewise resists water, the cooling of the mass may be carried out by the introduction of finely divided particles of ordinary ice. As the abrasive wheels ordinarily made are porous, the molds should be so constructed where ordinary ice is used that the mass will act as a filtration medium and allow the water to flow out from the bottom of the mold through channels provided therein. Upon subsequent elevation of temperature the mass will again become sticky and tacky and may be formed into the desired shape.

Various resins are useful for my purpose although the method of their handling varies, of course, with their physical characteristics. However, I find that the phenol aldehyde resins are ordinarily to be preferred for the production of grinding wheels, and preferably I have found formaldehyde and furfural to be the most suitable aldehydes although, of course, other aldehydes could be used. Similarly, the ammonia derivatives of aldehydes combined with phenol are also useful for my purpose as, for example, resins made of phenol and hexamethylenetetramine or phenol and furfuramid. The carbohydrates combined with phenol resins are also useful as are the phenol polyhydric alcohol type of resins. For high temperature resistance the glyptal type of resins such as those made of a polybasic acid and polyhydric alcohol are most useful. Although these products do not have the rigidity of the phenol resins, their resistance to high temperature, however, makes these products of use under certain limited conditions. Urea and thiourea resins are now being produced in several well known forms and these together with the vinyl compounds are useful resins for my purpose where great flexibility and shock resistance are desirable.

Where urea and thiourea resins are used, I do not find it desirable to introduce ordinary ice into the mix inasmuch as many of these liquid resinous products are water soluble and therefore the addition of ice would be detrimental to the strength of the finished body. The use of a dry, gaseous refrigerant or the cooling of the apparatus or the cooling of the sticky mass in a refrigerator is much to be desired.

Wherein I speak of liquid resins I prefer those products which, when combined, may readily be hardened at ordinary atmospheric pressures without undue loss of necessary reagents. Furthermore, I prefer not to add solvents such as alcohol, acetone, furfural, benzaldehyde, etc. inasmuch as I find that the added solvents make it difficult to secure the same strength of adhesion between the resin particle and the abrasive granule that it is possible to secure through the use of condensation products of low polymerization. It is not, however, to be understood that this process cannot be operated through the addition of solid resins made liquid by the addition of solvents, but the addition of such solvents is objectionable inasmuch as the freezing point of the mixture is greatly depressed and therefore more cooling will be required than if the liquid resin products themselves are so used. The addition of furfural and other solvent aldehydes, particularly in connection with synthetic resins utilizing hexamethylenetetramine as a resin forming component or hardening agent is objectionable inasmuch as such plastic resinous mass has short keeping qualities because the liberated ammonia from the hexamethylenetetramine when in the presence of an aldehyde having slightly acid characteristics will immediately combine with the aldehyde forming its ammonia derivative and the mass will lack adhesion and may even be converted to a gel-like consistency.

By my method I am enabled to utilize any sticky, tacky bonding material which I may mix in most any proportions with suitable abrasive materials and which I may convert to a non-sticky, non-tacky condition at will, permitting the mass to be broken up into individual coated granules or uniform sized particles to allow for a uniform distribution within the mold cavity. It therefore is not necessary to give detailed examples of the process to be followed in the production of liquid synthetic resins, as this invention has in mind the use of these products as a starting point and the method teaches the use of such products in the production of useful abrasive bodies.

The example given has been by way of illustration, and it is to be understood that wide variations may be made in the proportions, in the type of refrigerant used, in the method of refrigeration, and in the manner of forming the abrasive bodies, as will readily be understood from the facts given in the specification and as covered by the appended claims.

What I claim is:—

1. A composition for the production of abrasive bodies comprising a mass of abrasive granules coated with a coherent, adhesive liquid-like synthetic resin product converted temporarily to a granular noncoherent form by cooling.

2. A composition for the production of abrasive bodies comprising a mass of abrasive granules coated with a coherent, normally adhesive synthetic resin product converted temporarily to a granular noncoherent form by cooling and reconvertible to a desired degree of coherence by a rise in mass temperature.

3. A composition for the production of abrasive bodies comprising a mass of abrasive granules coated with a coherent, adhesive liquid-like synthetic resin product converted temporarily to a granular noncoherent form by cooling and reconvertible to a desired degree of coherence and formed into an abrasive body of a normal hard and set form.

4. The herein described method of making a synthetic resin bonded abrasive composition comprising, coating the surfaces of abrasive granules with a coherent, normally adhesive synthetic resin product and converting the product temporarily to a granular noncoherent form.

5. The herein described method of making a synthetic resin bonded abrasive composition comprising, coating the surfaces of abrasive granules with a coherent, adhesive liquid-like synthetic resin product and converting the product temporarily to a granular noncoherent form by cooling the mass.

6. The herein described method of making a synthetic resin bonded abrasive composition comprising, coating the surfaces of abrasive granules with a coherent, normally adhesive synthetic resin product and converting the product temporarily to a granular noncoherent form by cooling the mass and reconverting the noncoherent granular mass to a desired degree of coherence by a rise in the mass temperature.

7. The herein described method of making a synthetic resin bonded abrasive composition comprising, coating the surfaces of abrasive granules with a coherent, adhesive liquid-like synthetic resin product and converting the product temporarily to a granular noncoherent form by cooling the mass and reconverting the noncoherent granular mass to a desired degree of coherence by a rise in the mass temperature and causing the coated particles to cohere into the form of an abrasive implement.

8. The herein described method of making a synthetic resin bonded abrasive composition comprising, coating the surfaces of abrasive granules with a coherent, adhesive balsam-like synthetic resin product and converting the product temporarily to a granular noncoherent form by cooling the mass and reconverting the noncoherent granular mass to a desired degree of coherence by a rise in the mass temperature and causing the coated particles to cohere into the form of an abrasive implement and hardening and setting the formed abrasive implement into a normal hard and set form.

9. The herein described method of making a synthetic resin bonded abrasive composition comprising, coating the surfaces of abrasive granules with a coherent, adhesive synthetic resin condensation product and cooling the mass and converting the reactive resinous mass, temporarily, to a relatively noncoherent granular form by means of a refrigerant capable of absorbing heat from the mass.

10. The herein described method of making a synthetic resin bonded abrasive composition comprising, coating the surfaces of abrasive granules with a coherent adhesive synthetic resin condensation product and cooling the mass by means of a refrigerant added to the composition capable of absorbing heat from the mass and converting the reactive resinous mass, temporarily, to a relatively noncoherent granular form.

11. The herein described method of making a synthetic resin bonded abrasive composition comprising, coating the surfaces of abrasive granules with a coherent, adhesive synthetic resin condensation product and cooling the mass and by adding a solid refrigerant capable of absorbing heat from the mass converting the reactive resinous mass, temporarily, to a relatively noncoherent granular form.

12. The herein described method of making a synthetic resin bonded abrasive composition comprising, coating the surfaces of abrasive granules with a coherent, adhesive synthetic resin condensation product and cooling the mass and by adding a solid gaseous refrigerant capable of absorbing heat from the mass converting the reactive resinous mass, temporarily, to a relatively noncoherent granular form.

13. The herein described method of making a synthetic resin bonded abrasive composition comprising, coating the surfaces of abrasive granules with a coherent, adhesive synthetic resin condensation product and cooling the mass and by adding a solidified carbon dioxide refrigerant capable of absorbing heat from the mass converting the reactive resinous mass, temporarily, to a relatively noncoherent granular form.

14. A composition for the production of abrasive bodies comprising a mass of abrasive granules coated with a coherent, normally adhesive synthetic resin product converted to a temporarily granular noncoherent form by the action thereon of a refrigerant.

15. A composition for the production of abrasive bodies comprising a mass of abrasive granules coated with a coherent, adhesive synthetic resin product and containing a solidified gas for converting the mass to a temporarily granular noncoherent form.

16. A composition for the production of abrasive bodies comprising a mass of abrasive granules coated with a coherent, adhesive synthetic resin product and containing a solidified carbon dioxide for converting the mass to a temporarily granular non-coherent form.

17. A composition for the production of abrasive bodies comprising, a liquid condensation product of phenol and formaldehyde, abrasive granules, and solidified carbon dioxide.

Signed at Philadelphia in the County of Philadelphia and State of Pennsylvania this 25th day of July A. D. 1929.

EMIL E. NOVOTNY.